J. TAYLOR.
Smut Mill.
No. 5,503.
Patented Apr. 11, 1848.
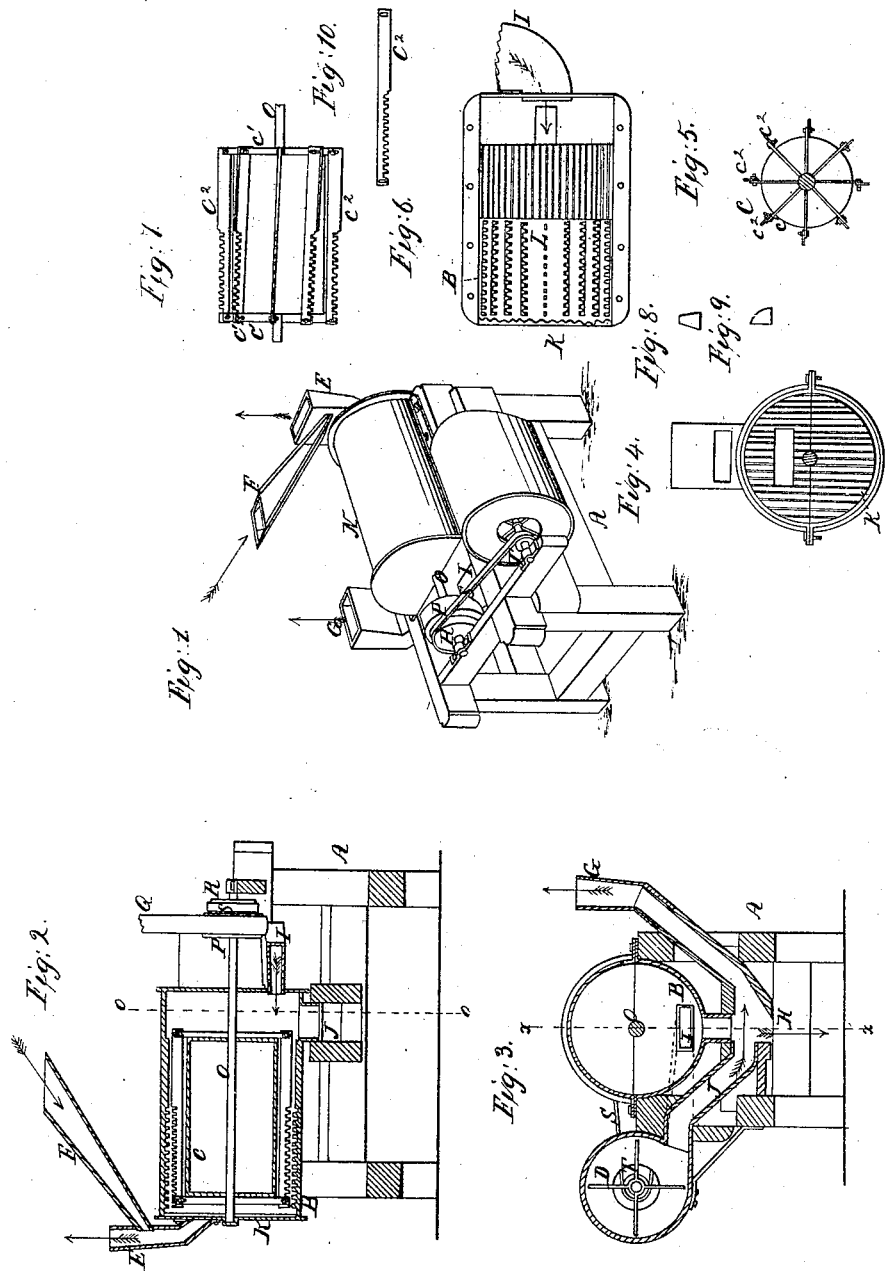

UNITED STATES PATENT OFFICE.

JESSE TAYLOR, OF AUBURN, NEW YORK.

SMUT-MACHINE.

Specification of Letters Patent No. 5,503, dated April 11, 1848.

*To all whom it may concern:*

Be it known that I, JESSE TAYLOR, of the town of Auburn, county of Cayuga, and State of New York, have invented certain new and useful Improvements in the Manner of Constructing Machines for Separating Smut and other Dirt from Wheat and other Grain, called "Taylor's Improved Smut-Machines," which is described as follows, reference being had to the annexed drawings of the same, making part of this specification.

Figure 1, is a perspective view of the machine as arranged for operation. Fig. 2, is a longitudinal section on the dotted line *x x* of Fig. 3. Fig. 3, is a vertical transverse section on the line *o, o*, of Fig. 2. Fig. 4, is a view of the inside of the head of the concave showing the ribs thereon. Fig. 5, is a view of the outer end of the rubber which turns opposite to the ribbed head Fig. 4. Fig. 6, is a section of the inside of the concave or stationary case. Fig. 7 is a view of the outside of the revolving rubber. Figs. 8 and 9 views of one of the teeth. Fig. 10 one of the rubbers detached.

The general feature of the smut machine are like many others in use, so far as they relate to its being composed of a rectangular frame containing a stationary cylindrical concave roughened on the inside, and a revolving cylindrical rubber with inclined beaters on its outer surface, an inclined trough for introducing the grain, a spout for discharging it, and a fan for blowing the dirt from the grain, arranged, however, differently from the same parts in other machines.

The first and essential improvement that I have made in the machine, and for which I solicit Letters Patent, consists in producing two currents or blasts of wind simultaneously from the same rotary fan combined with the machine, one of the blasts being longitudinally through the entire length of the cylindrical concave and parallel with its axis and around the outside of the revolving rubber, and out through an upright tube at the feeding end into which the inclined feeding spout leads, for separating the loose dirt from the grain as it passes into and before it enters the machine through said tube from the feeding hopper, and the smut separated from the grain in subsequently passing through the machine, and the other, or transverse blast, crossing it at right angles at the discharging end of the machine at the lower outside surface of the stationary cylinder for blowing the remaining smut and dirt from the grain out of another upright tube as the grain descends through a tube below to the receiver in the usual manner.

The second improvement consists in the mode of making the revolving rubber by attaching the beaters or rubbers for beating the smut from the grain, to the ends of the radial arms of the revolving cylinder, by oblong mortises in the ends of the radial arm (or in the beaters as preferred) and screw bolts and nuts for the facility of adjustment, so that they can be brought nearer to a receder further from the inside of the concave as required, and arranging said adjustable beaters in oblique parallel lines, inclining about ten degrees from the line of the axis of the cylinder, previously covered with sheet iron to preserve the grain in its proper place while passing through the machine. The obliquity of said blades or beaters causing the grain to be forced spirally against the pressure of the internal blast of wind toward the discharging end. The teeth on the edges of the blades or beaters which are in the form of Fig. 8, in the drawings, serving to cut the smut from the grain and the plain portions to polish the grain. The notches are made in the outer edge of the blades or beaters, forming oblong teeth in the form as above mentioned the remaining portions of the beaters, about half their length next the smooth end of the concave are made plain and smooth.

The end of the rubber next and opposite the fluter and ribbed end of the concave is made with radial ribs or wings radiating from the center for striking the grain and throwing it against the ribs on the end of the concave for breaking the smut from the grain.

The radial wings also increase the draft in the machine for blowing the smut out through the upright tube into which the inclined feeding trough is inserted.

The third improvement consists in the manner of forming the inside of the concave which is done by making one-half more or less of its entire length and circumference in paralleled toothed ribs or rows of teeth and one thin more or less in paralleled ribs and the remaining portion plain, and the head next the hopper with ribs inside and the head next the discharging end plain, and having it constructed of sufficient length to form a space next the discharging end for the grain to enter previous to the separation of the remaining smut therefrom by the transverse blast of wind from the fan. The stationary cylinders of cast iron in two half circles with the teeth and ribs cast on the same. The teeth being in form of Figs. 8 and 9, in the drawings, Fig. 8 being a front view of one of the teeth and Fig. 9 being a side view of the same, being cast to a point which renders them hard and not liable to wear.

N, is the sheathing or covering of the stationary cylinder.

O, is the shaft of the rubber cylinder.

P, is a pulley on the shaft of the revolving rubber.

Q, is the band leading from said pulley to the driving power which may be steam, water, horse, or manual.

R, is a smaller pulley on the same shaft, around which a band, S, passes to a pulley, T, on the axle of the fan, and by which the rubber and fan are made to revolve simultaneously. The operation of the machine having been described in explaining the nature of the machine need not be repeated.

I do not claim making a smut machine with a stationary ribbed concave and revolving rubber of oblique beaters, revolving fan and tubes, or spouts for the admission and discharge of the grain, smut, dirt, &c., except in the manner above described, as these have heretofore been constructed and combined in various ways.

A, is the frame made of suitable size, strength and material; B, the concave fixed in the frame; C, the revolving rubber; D, the fan; E, the upright tube at the feed end of the concave, the lower portion of said tube being curved inward and inserted into the head designed to convey the grain to the space between the concave and rubber previously introduced from the hopper through the inclined spout F, which is inserted into the side of said upright tube, the upper portion being designed to carry off the smut and dirt from the blast of wind from the fan, G is another upright tube through which the remaining smut and dirt are blown by the transverse blast of wind from the fan passing under the discharging end of the concave between the said concave and the receiver.

H, is an inclined spout for conveying the cleaned grain to the receiver below the concave or in some convenient place.

I, is a curved spout leading from the fan to the interior of the concave for directing the longitudinal blast of wind through said concave.

J, is a curved tube also leading from the fan under the concave for directing the transverse blast of wind between the receiver and the discharging point at the lower surface of the concave.

K, is the fluted or ribbed head of the concave.

L, is a section of the interior of the concave showing the rubbers therein.

$C^2$, is one of the notched blades or beaters made of band iron or steel of the thickness of one-eighth of an inch attached to the arms of the revolving cylinder. See Fig. 10 of the drawings.

What I claim as my invention, and desire to secure by Letters Patent, is—

Making the rubbers and concave with a notched and smooth portion in the manner and for the purpose above set forth.

JESSE TAYLOR.

Witnesses:
J. H. BOSTWICK.
S. B. GROSVENOR.